(12) United States Patent
Hsu et al.

(10) Patent No.: US 7,726,827 B2
(45) Date of Patent: *Jun. 1, 2010

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/960,752

(22) Filed: Dec. 20, 2007

(65) Prior Publication Data
US 2009/0129078 A1    May 21, 2009

(30) Foreign Application Priority Data
Nov. 16, 2007   (CN) .................... 2007 1 0202566

(51) Int. Cl.
*G09F 13/04* (2006.01)
*G09F 13/08* (2006.01)
(52) U.S. Cl. .................. 362/97.2; 362/330; 362/620; 362/626
(58) Field of Classification Search ............... 362/97, 362/330–331, 620, 626, 97.2; 359/619; 349/61–63, 349/66
See application file for complete search history.

(56) References Cited

U.S. PATENT DOCUMENTS

2006/0087743 A1    4/2006  Choi et al.

FOREIGN PATENT DOCUMENTS

| CN | 1716027 A   | 1/2006  |
| CN | 101025516 A | 8/2007  |
| CN | 101117270 A | 8/2007  |
| JP | 2004309802  | 11/2004 |

*Primary Examiner*—Jason Moon Han
(74) *Attorney, Agent, or Firm*—Frank R. Niranjan

(57) ABSTRACT

An exemplary prism sheet includes a transparent main body. The main body includes a first surface and a second surface. The first surface is opposite to the second surface. A plurality of micro-depressions are defined in the first surface. A plurality of elongated arc-shaped protrusions are formed on the second surface. Each micro-depression is defined by four connecting sidewalls. A transverse width of each sidewall of each micro-depression progressively decreases with increasing distance from the second surface. A backlight module using the present prism sheet is also provided.

20 Claims, 8 Drawing Sheets

PRISM SHEET AND BACKLIGHT MODULE USING THE SAME

CROSS-REFERENCE TO RELATED APPLICATIONS

This application is related to eight co-pending U.S. patent applications, which are: application Ser. No. 11/938,307 and Ser. No. 11/938,308, filed on Nov. 12, 2007, and both entitled "PRISM SHEET AND BACKLIGHT MODULE USING THE SAME"; application Ser. No. 11/940,328, filed on Nov. 15, 2007, and entitled "PRISM SHEET AND BACKLIGHT MODULE USING THE SAME", application Ser. No. 11/946,866 and Ser. No. 11/946,867, filed on Nov. 12, 2007, and both entitled "PRISM SHEET AND BACKLIGHT MODULE USING THE SAME", and application Ser. Nos. 11/949,058, 11/949,059, and 11/949,060, filed on Dec. 3, 2007, and all entitled "PRISM SHEET AND BACKLIGHT MODULE USING THE SAME". In the co-pending application, the inventors are Tung-Ming Hsu and Shao-Han Chang. The co-pending applications have the same assignee as the present application. The disclosure of the above identified applications are incorporated herein by reference.

BACKGROUND OF THE INVENTION

1. Field of the Invention

The present invention relates to prism sheets, particularly, to a prism used in a backlight module.

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

FIG. 6 represents a typical direct type backlight module 100. The backlight module 100 includes a housing 11, a plurality of lamps 12 disposed above a base of the housing 11, and a light diffusion plate 13 and a prism sheet 10 stacked on top of the housing 11 in that order. Inner walls of the housing 11 are configured for reflecting light upwards. The light diffusion plate 13 includes a plurality of dispersion particles (not shown) therein. The dispersion particles are configured for scattering light, thus enhancing the uniformity of light exiting the light diffusion plate 13.

Referring to FIG. 7 together with FIG. 6, the prism sheet 10 includes a base layer 101 and a prism layer 102 formed on the base layer 101. The prism layer 102 contains a plurality of parallel prism lenses 103 having a triangular cross section. The prism lenses 103 are configured for collimating light to a certain extent. Typically, a method of manufacturing the prism sheet 10 includes the following steps: first, a melted ultraviolet (UV)-cured transparent resin is coated on the base layer 101 to form V-shaped lenses, then the melted UV-cured transparent resin is solidified to form the prism lenses 103.

In use, light from the lamps 12 enters the light diffusion plate 13 and becomes scattered. The scattered light leaves the light diffusion plate 13 and enters the prism sheet 10. The scattered light then travels through the prism sheet 10 before being refracted out at the prism lenses 103 of the prism layer 102. Thus, the refracted light leaving the prism sheet 10 is concentrated at the prism layer 102 and increases the brightness (illumination) of the prism sheet 10. The refracted light then propagates into an LCD panel (not shown) disposed above the prism sheet 10.

When the light is scattered in the light diffusion plate 13, scattered light enters the prism sheet at different angles of incidence. Referring to FIG. 8, when scattered light enters the prism sheet 10 at different angles of incidence, the scattered light generally travels through the prism sheet 10 along three light paths. In the first light path (such as a1, a2) the light enters the prism sheet at small angles of incidence and refracts out of the prism lenses with the refracted path closer to the normal to the surface of the base layer. In the second light path (such as a3, a4) the light enters the prism sheet 10 at angles of incidence larger than the first light path and refracts out of the prism lenses 103 with the refracted path being closer to the normal to the surface of the prism lenses 103. Both the first light path and the second light path contribute to the brightness of the LED and the light utilization efficiency of the backlight module 100. However, in the case of the third light path (such as a5, a6), the light enters the prism sheets at angles greater than the second light path, such that when the refracted light in the third light path leaves the prism sheet 10 at the prism lenses 103 the refracted light impinges on the surface of adjacent prism lens 103 and reenters the prism sheet 10. Thus, light traveling along the third light path will eventually reenter the prism sheet 10 and may exit the prism sheet 10 on the same side the light entered. This third light path does not contribute to the light utilization efficiency of the backlight module 100. Further, the third light path may interfere with or inhibit other incident light resulting in decreasing brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface and a second surface. The first surface is opposite to the second surface. The first surface defines a plurality of micro-depressions. Each micro-depression is defined by four connecting sidewalls. A transverse width of each sidewall of each micro-depression progressively decreases with increasing distance from the second surface. A plurality of elongated arc-shaped protrusions are formed on the second surface.

In another aspect, a backlight module according to a preferred embodiment includes a plurality of lamps, a light diffusion plate, and a prism sheet. The light diffusion plate is positioned above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
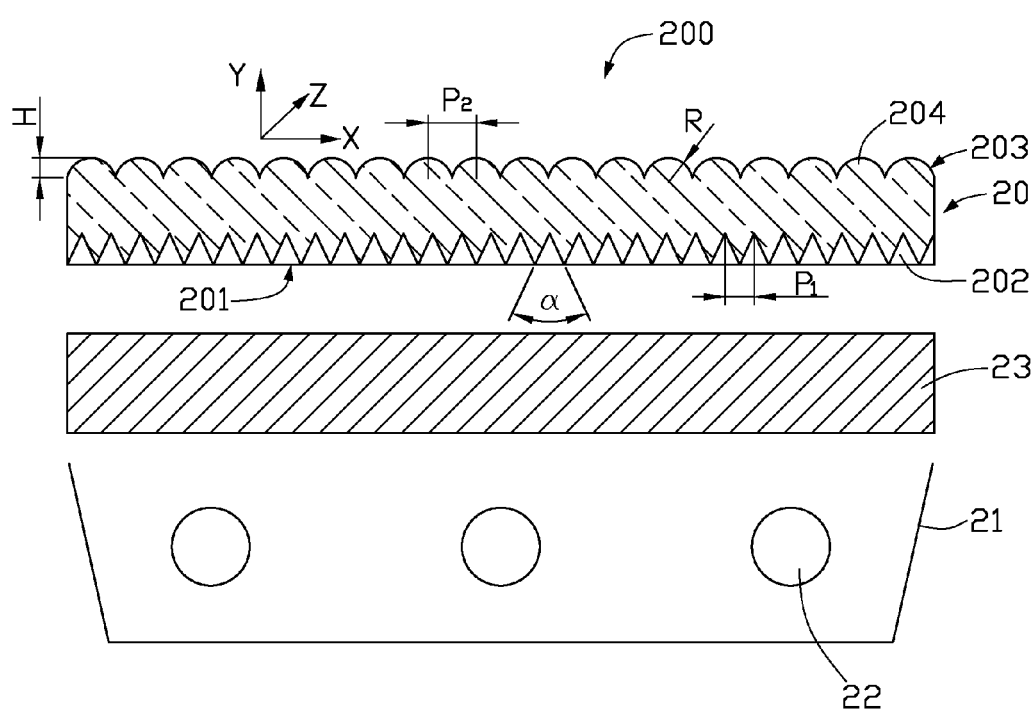
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a housing 21, a plurality of lamps 22, and a light diffusion plate 23. The lamps 22 are regularly aligned above a base of the housing 21. The light diffusion plate 23 and the prism sheet 20 are stacked on the top of the housing 21 in that order.

Figure 2:
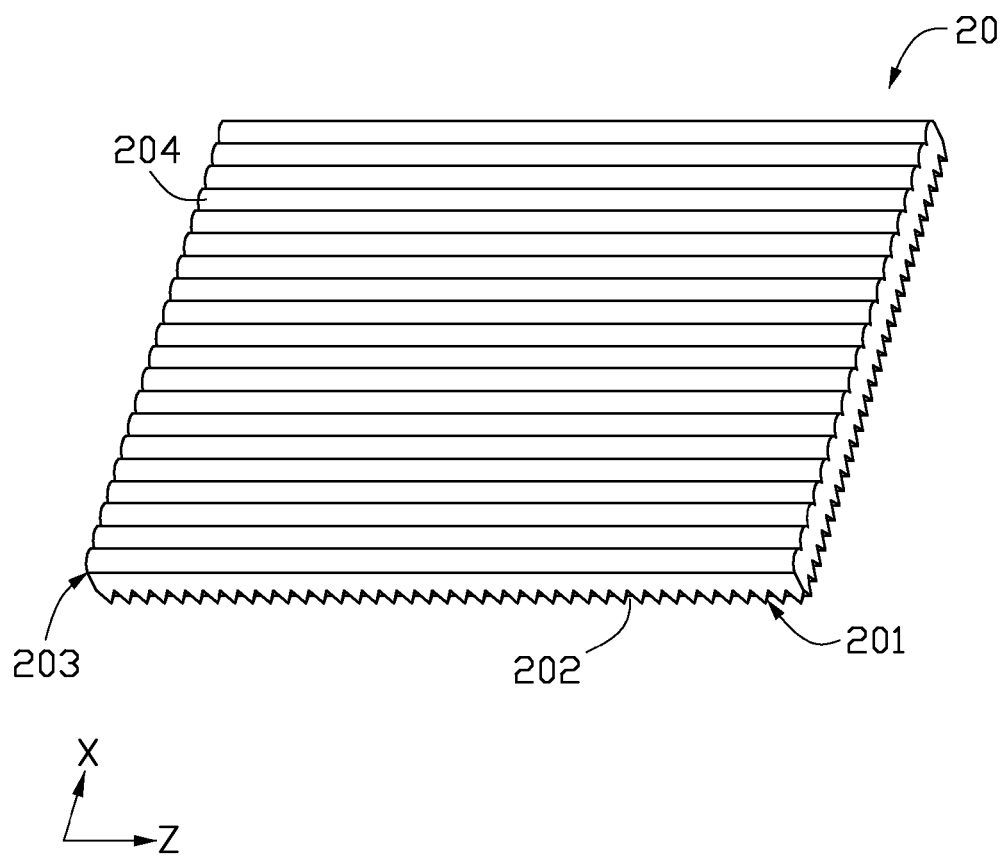
FIG. 2 is an isometric view of the prism sheet of FIG. 1.
Figure 3:
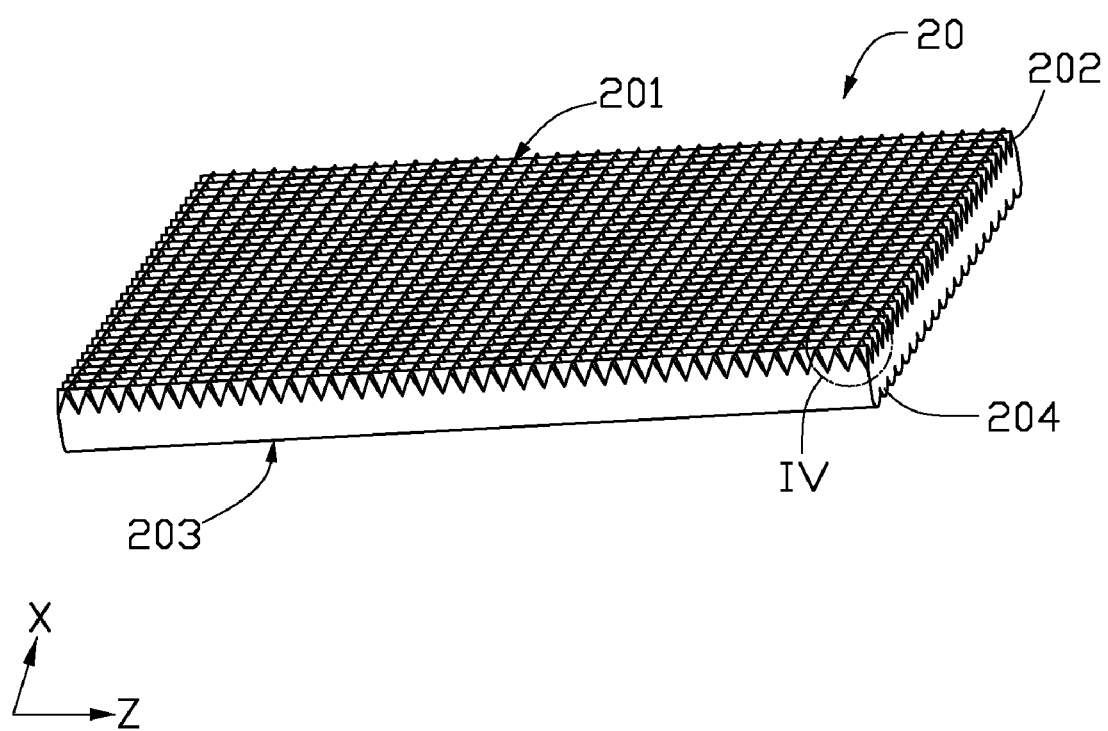
FIG. 3 is another isometric view of the prism sheet of FIG. 1.
Figure 4:
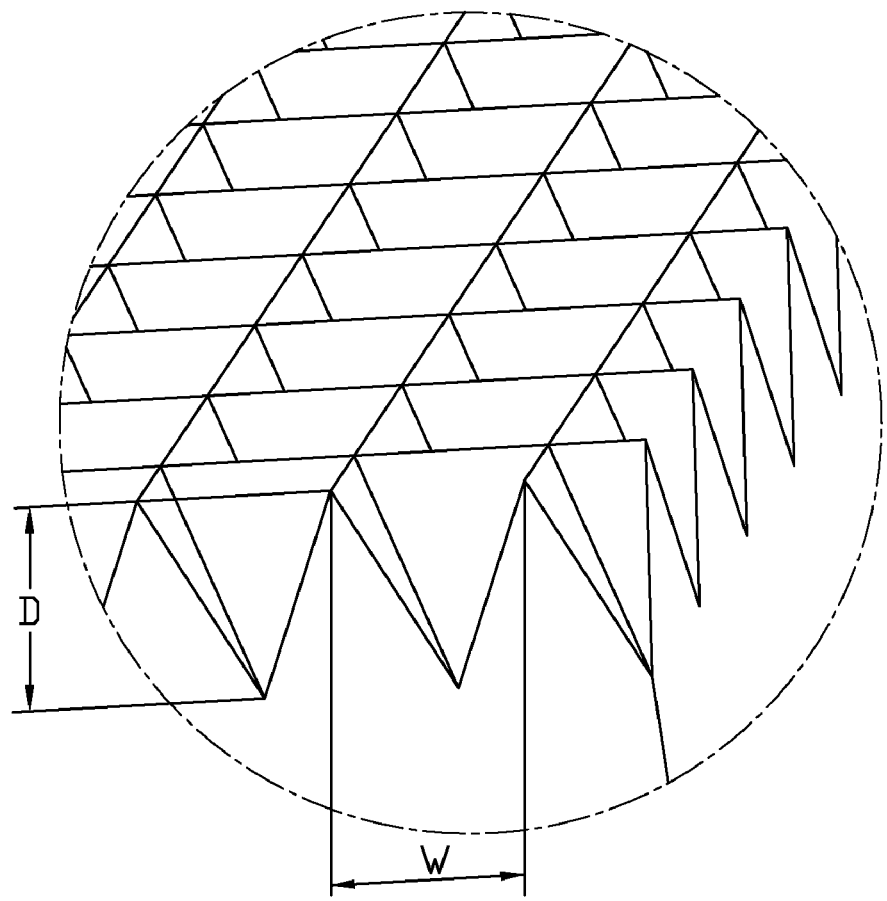
FIG. 4 is an enlarged view of a circled portion IV of FIG. 3.

Referring to FIGS. 2 through 4, the prism sheet 20 includes a transparent main body. The main body includes a first surface 201 and a second surface 203. The first surface 201 and the second surface 203 are on opposite sides of the main body. Furthermore, the first surface 201 defines a plurality of microdepressions 202. A plurality of elongated arc-shaped protrusions 204 protrudes from the second surface 203. The prism sheet 20 is stacked on the light diffusion plate 23 in a way such that the first surface 201 is adjacent to the light diffusion plate 23, and the second surface 203 faces away from the light diffusion plate 23. Each micro-depression 202 had a shape like an inverted pyramid formed by four connecting triangular sidewalls. In the illustrated embodiment, each micro-depression 202 is a square pyramidal depression forming four triangular sidewalls. A transverse width W of each of the sidewalls progressively decreases with increasing distance D from the first surface 201.

The micro-depressions 202 are configured for enabling the first surface 201 to converge incident light from the lamps 22 entering the prism sheet 20 to a certain extent (hereafter first light convergence). The micro-depressions 202 are distributed on the first surface 201 in a matrix manner. Each microdepression 202 is a square pyramidal depression formed by four triangular sidewalls. The rows and the columns of the micro-depressions 202 in the matrix are parallel to the edges of the prism sheet 20 (along the X-direction and a Z-direction) correspondingly. Sidewalls of adjacent micro-depressions 202 are joined, forming a crest. The crest extends across the prism sheet 20 in the X-direction or Z-direction. Referring to FIG. 1 again, a pitch $P_2$ between adjacent micro-depressions 202 along the X-axis direction is configured to be in a range from about 0.025 millimeters to about 1 millimeter. A pitch $P_3$ between adjacent micro-depressions 202 along the Z-axis direction is configured to be in a range from about 0.025 millimeters to about 1 millimeter. A dihedral angle α defined by sidewalls on opposite sides of each of the micro-depressions 202, is configured to be in a range from about 40 degrees to about 120 degrees.

The elongated arc-shaped protrusions 204 are configured for enabling the second surface 203 to converge light exiting the second surface 203 (hereafter second light convergence). The elongated arc-shaped protrusions 204 are aligned side by side on the second surface 203 of prism sheet 20. An outline of each elongated arc-shaped protrusions 204 taken along a plane perpendicular to the elongated arc-shaped protrusions 204 is a circular arc. A pitch $P_2$ between adjacent elongated arc-shaped protrusions 204 is configured to be in a range from about 0.025 millimeters to about 1.5 millimeters. A radius R of a circular arc defined by taken along a plane perpendicular to the elongated arc-shaped protrusions 204 is configured to satisfy a following formula: $0.01$ millimeters $\leq R \leq 2P_2$. A height H of each elongated arc-shaped protrusion 204 is configured to satisfy a following expression: $0.01$ millimeters $\leq H \leq R$. In alternative embodiments, the elongated arc-shaped protrusions 204 are aligned obliquely corresponding to edges of the prism sheet 20. In other alternative embodiments, adjacent elongated arc-shaped protrusions 204 can be spaced apart from each other by a predetermined interval.

A thickness of the prism sheet 20 is preferably in a range from about 0.5 millimeters to about 3 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Again referring to FIG. 1, the lamps 22 can be point light sources such as light emitting diodes or linear light sources such as cold cathode fluorescent lamps. In the illustrated embodiment, the lamps 22 are cold cathode fluorescent lamps. The interior of the housing 21 is configured to be highly reflective.

In the backlight module 200, when light enters the prism sheet 20 via the first surface 201, the light undergoes the first light convergence at the first surface 201. Then the light further undergoes the second convergence at the second surface 203 before exiting the prism sheet 20. Thus, a brightness of the backlight module 200 is increased. In addition, due to the arc-shaped protrusions 204, most of the light exiting the prism sheet 20 would propagate along a direction parallelling the Y-direction or slight deviation therein. Thus, the light energy utilization rate of the backlight module 200 is high.

Furthermore, in contrast to the conventional prism sheet, the prism sheet 20 of the present invention is integrally formed by injection molding technology. Injection molding technology allows the prism sheet 20 to be easier to massproduce than that of the conventional prism. Conventional prism sheet are formed by solidifying melted ultravioletcured transparent resin and as such, the prism lenses are easily damaged and/or scratched due to poor rigidity and mechanical strength. The present prism sheet, when compared to the conventional prism sheet, has better rigidity and mechanical strength. Therefore, the present prism sheet 20 has a relative high reliability.

Figure 5:
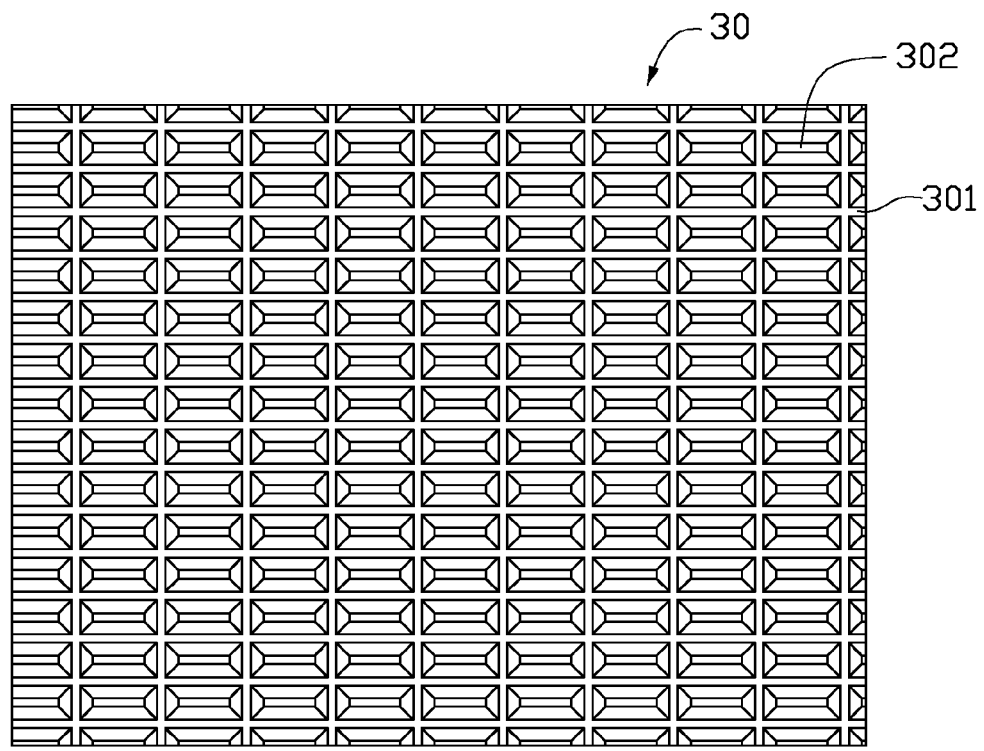
FIG. 5 is a top plan view of a prism sheet according to a second preferred embodiment of the present invention.
Figure 6:
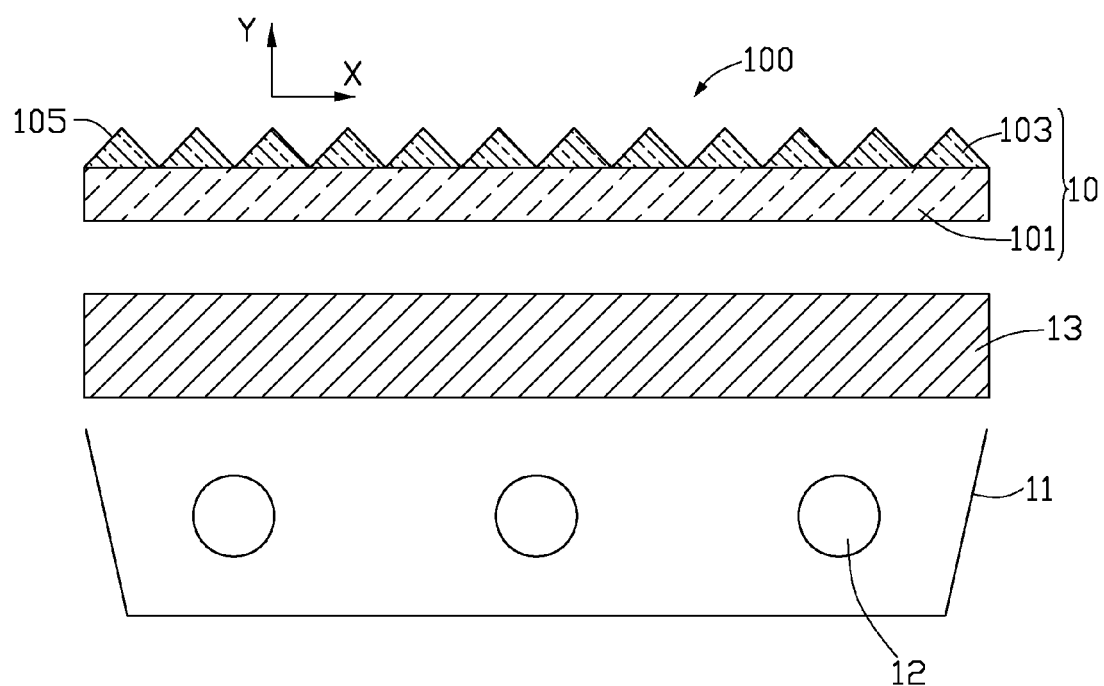
FIG. 6 is a side, cross-sectional view of a conventional backlight module employing a typical prism sheet.
Figure 7:
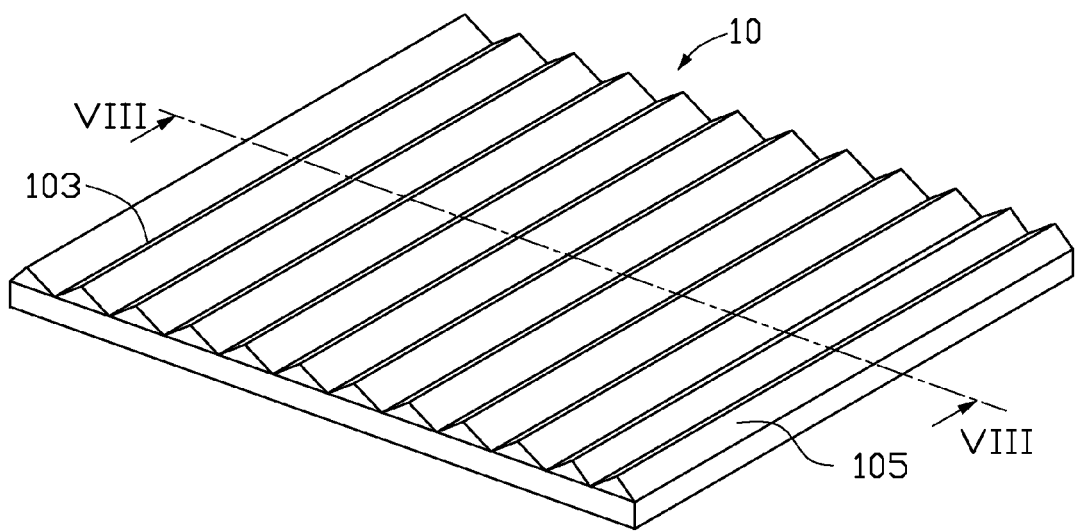
FIG. 7 is an isometric view of the prism sheet shown in FIG. 6.
Figure 8:
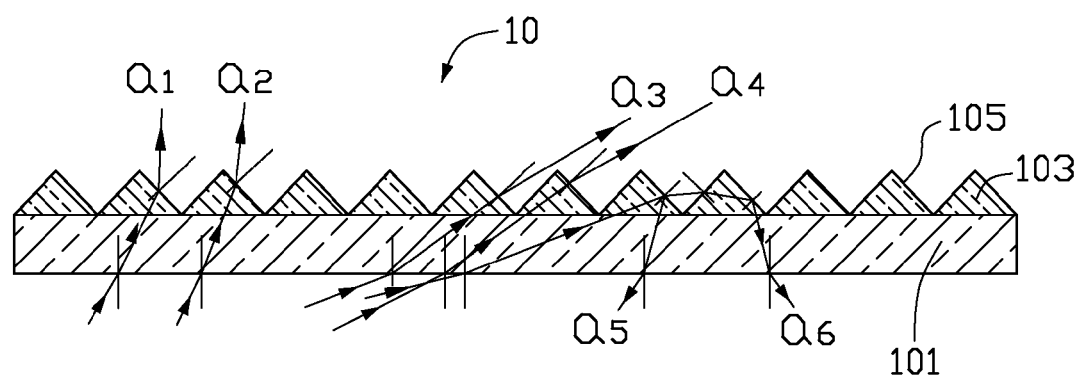
FIG. 8 is side, cross-sectional view of the prism sheet of FIG. 7, taken along line VIII-VIII, showing light transmission paths.

Referring to FIG. 5, a prism sheet 30 in accordance with a second preferred embodiment of the present invention is shown. The prism sheet 30 is similar in principle to the prism sheet 20. A plurality of micro-depressions 302 are defined in the first surface 301 in a matrix manner. However, each microdepression 302 is formed by four trapezium sidewalls. Shapes and sizes of the sidewalls are the same. Thereby, the four sidewalls and a base connecting to the four sidewalls cooperatively define a frustum of an inverted pyramid. The microdepressions 302 are aligned apart on second surface 303.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet for a backlight module within a liquid crystal display device comprising
   a transparent main body within the backlight module having:
   a first surface,
   a second surface opposite to the first surface,
   a plurality of micro-depressions defined in the first surface, and a plurality of elongated arc-shaped protrusions formed on the second surface, wherein each of the micro-depressions is defined by four connecting sidewalls, wherein a transverse width of each sidewall progressively decreases with increasing distance from the first surface.

2. The prism sheet according to claim 1, wherein the micro-depressions are selected from a group consisting of pyramidal depression and frustum of pyramidal depression.

3. The prism sheet according to claim 2, wherein a dihedral angle defined by two opposite sidewalls of each of the micro-depression is in a range from about 40 degrees to about 120 degrees.

4. The prism sheet according to claim 1, wherein a pitch of the adjacent micro-depressions is configured to be in a range from about 0.025 millimeters to about 1 millimeter.

5. The prism sheet according to claim 1, wherein the micro-depressions are defined in the first surface in a matrix manner.

6. The prism sheet according to claim 5, wherein rows or columns of the micro-depressions are parallel to or slanted to an edge of the prism sheet.

7. The prism sheet according to claim 1, wherein the elongated arc-shaped protrusions are aligned side by side on the second surface of the prism sheet.

8. The prism sheet according to claim 7, wherein a pitch between adjacent elongated arc-shaped protrusions is a range from about 0.025 millimeters to about 1.5 millimeters.

9. The prism sheet according to claim 1, wherein an outline of each elongated arc-shaped protrusions taken along a plane perpendicular to the elongated arc-shaped protrusions is a circular arc.

10. The prism sheet according to claim 1, wherein a thickness of the prism sheet is in a range from about 0.5 millimeters to about 3 millimeters.

11. The prism sheet according to claim 1, wherein the prism sheet is made of transparent material selected from the group consisting of polycarbonate, polymethyl methacrylate, polystyrene, copolymer of methylmethacrylate and styrene, and any combination thereof.

12. A backlight module within a liquid crystal display device comprising:
    a plurality of lamps within the backlight module;
    a light diffusion plate positioned above the lamps; and
    a prism sheet positioned on the light diffusion plate, the prism sheet including a transparent main body having
    a first surface,
    a second surface opposite to the first surface, and
    a plurality of micro-depressions defined in the first surface, and a plurality of elongated arc-shaped protrusions formed on the second surface, wherein each of the micro-depression is defined by four connecting sidewalls, wherein a transverse width of each sidewall progressively decreases with increasing distance from the first surface.

13. The backlight module according to claim 12, wherein the micro-depressions are selected from a group consisting of pyramidal depression and frustum of pyramidal depression.

14. The backlight module according to claim 13, wherein a dihedral angle defined by two opposite sidewalls of each of the micro-depression is in a range from about 40 degrees to about 120 degrees.

15. The backlight module according to claim 12, wherein the micro-depression are distributed on the first surface in a matrix manner.

16. The backlight module according to claim 15, wherein rows or columns of the micro-depressions are parallel to or slanted to an edge of the prism sheet.

17. The backlight module according to claim 12, wherein the elongated arc-shaped protrusions are aligned side by side on the second surface of the prism sheet.

18. The backlight module according to claim 12, wherein a pitch between adjacent elongated arc-shaped protrusions is a range from about 0.025 millimeters to about 1.5 millimeters.

19. The backlight module according to claim 12, wherein an outline of each elongated arc-shaped protrusions taken along a plane perpendicular to the elongated arc-shaped protrusions is a circular arc.

20. The backlight module according to claim 12, wherein a thickness of the prism sheet is in a range from about 0.5 millimeters to about 3 millimeters.

* * * * *